US009478045B1

(12) United States Patent
Hunnicutt et al.

(10) Patent No.: US 9,478,045 B1
(45) Date of Patent: Oct. 25, 2016

(54) VIBRATION SENSING AND CANCELING FOR DISPLAYS

(75) Inventors: Heath Hunnicutt, Seattle, WA (US);
Scott M. Dylewski, San Francisco, CA (US)

(73) Assignee: Amazon Technologies, Inc., Reno, NV (US)

(*) Notice: Subject to any disclaimer, the term of this patent is extended or adjusted under 35 U.S.C. 154(b) by 60 days.

(21) Appl. No.: 13/426,452

(22) Filed: Mar. 21, 2012

(51) Int. Cl.
| | | |
|---|---|---|
| G09G 5/00 | (2006.01) | |
| G06F 3/041 | (2006.01) | |
| G06T 11/00 | (2006.01) | |
| G06F 3/0485 | (2013.01) | |
| G06F 1/16 | (2006.01) | |

(52) U.S. Cl.
CPC ............. *G06T 11/00* (2013.01); *G06F 3/0485* (2013.01); *G06F 1/1626* (2013.01); *G06F 1/1694* (2013.01); *G09G 2320/0261* (2013.01)

(58) Field of Classification Search
None
See application file for complete search history.

(56) References Cited

U.S. PATENT DOCUMENTS

| | | | |
|---|---|---|---|
| 2003/0095155 A1* | 5/2003 | Johnson ........................ | 345/864 |
| 2004/0051783 A1* | 3/2004 | Chellappa et al. ............. | 348/46 |
| 2006/0017692 A1* | 1/2006 | Wehrenberg et al. ........ | 345/156 |
| 2006/0033879 A1 | 2/2006 | Covannon et al. | |
| 2008/0218475 A1* | 9/2008 | Appleyard et al. ........... | 345/158 |
| 2009/0112092 A1* | 4/2009 | Bae et al. ..................... | 600/447 |
| 2009/0201246 A1* | 8/2009 | Lee et al. ...................... | 345/156 |
| 2010/0061659 A1* | 3/2010 | Slack ................... | G06K 9/3216 |
| | | | 382/295 |
| 2010/0079485 A1* | 4/2010 | Bentley ......................... | 345/619 |
| 2010/0103081 A1 | 4/2010 | Takasugi et al. | |
| 2010/0224872 A1 | 9/2010 | Kimura | |
| 2010/0302055 A1 | 12/2010 | Yaguchi | |
| 2011/0037778 A1 | 2/2011 | Deng et al. | |
| 2011/0299792 A1* | 12/2011 | Sakaguchi et al. ........... | 382/255 |
| 2013/0083196 A1* | 4/2013 | Zheng ........................... | 348/148 |

OTHER PUBLICATIONS

Office Action for U.S. App. No. 13/426,517, mailed on Nov. 7, 2013, Scott M. Dylewski, "Vibration Sensing and Canceling Electronics", 20 pages.
Final Office Action for U.S. Appl. No. 13/426,517, mailed on Mar. 28, 2014, Scott M. Dylewski, "Vibration Sensing and Canceling Electronics", 26 pages.
Office action for U.S. Appl. No. 13/426,517, mailed on Sep. 23, 2014, Dylewski et al., "Vibration Sensing and Canceling Electronics", 18 pages.

* cited by examiner

*Primary Examiner* — Kee M Tung
*Assistant Examiner* — Yi Wang
(74) *Attorney, Agent, or Firm* — Lee & Hayes, PLLC

(57) ABSTRACT

This disclosure is directed at least in part to sensing movement of an electronic display and canceling perceived movement of content on the electronic display in response to the sensing. A display manager may reassign "physical pixels" to "image pixels" (or virtual pixels) such that the image appears to be stationary while the physical pixels are moving due to movement of the electronic display. For example, if the physical pixels are moving upward, the image pixels may be reassigned downward in an equal and opposite manner. The user's persistence of vision may then be reinforced by reassignment of the pixels by the display manager. For example, text displayed on the electronic display may be more readable and images more easily viewed by a user.

19 Claims, 8 Drawing Sheets

VIBRATION SENSING AND CANCELING FOR DISPLAYS

BACKGROUND

Electronic displays are commonly used in many different applications to enable users to receive or interact with information provided by an electronic device. For example, mobile telephones, laptop computers, tablet computers, automobile control systems, aircraft control systems, exercise equipment, navigational devices, and other types of electronic devices use electronic displays to provide information to a user and sometimes to receive information from the user (e.g., via a touch sensitive display).

Electronic displays are used in various environments and conditions, which may present different challenges when users are viewing information and content on the electronic displays. For example, when a user is viewing an electronic display in a moving vehicle or aircraft, the electronic display may vibrate or move in response to forces such as turbulence or an impact of a bump in a road. Such movement may make it difficult for a user to read text or otherwise interact with the electronic display.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
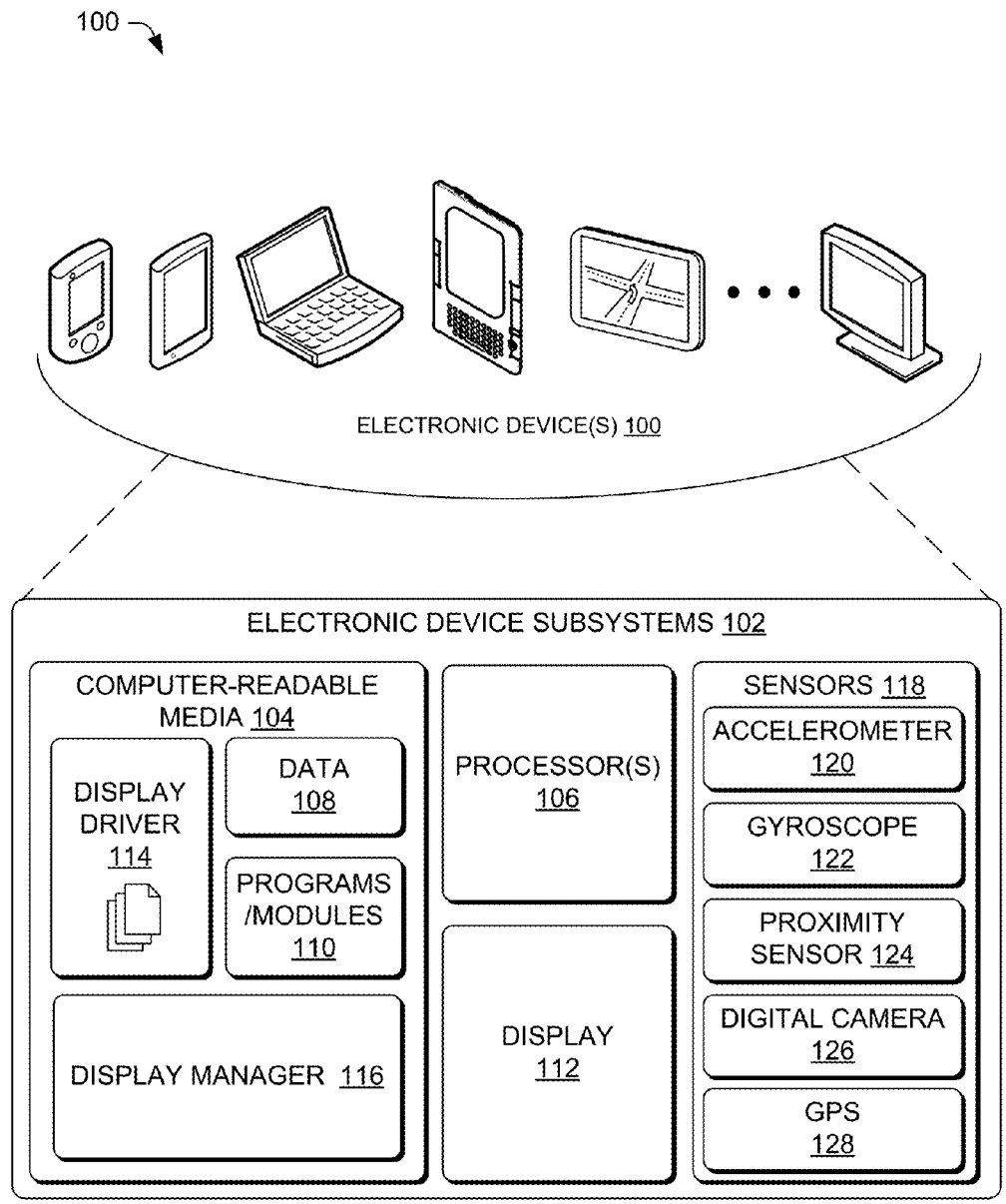
FIG. 1 is a schematic diagram of an illustrative electronic device that employs vibration sensing and canceling to minimize perceived movement or blur of text and images on a display.

This disclosure is directed at least in part to sensing movement of an electronic display and canceling perceived movement of content on the electronic display in response to the sensing. A display manager may reassign "physical pixels" to "image pixels" (or virtual pixels) such that the image appears to be stationary while the physical pixels are moving due to movement of the electronic display. For example, if the physical pixels are moving upward, the image pixels may be reassigned downward in an equal and opposite manner. The user's persistence of vision may then be reinforced by reassignment of the pixels by the display manager. For example, text displayed on the electronic display may be more readable and images more easily viewed by a user.

The sensors may include sensors to detect and measure movement, such as an accelerometer, a gyroscope, a proximity sensor, a digital camera, a global positioning system (GPS) sensor, and/or other types of sensors capable of detecting movement. The movement may be a linear movement, an oscillation, a vibration, or any other type of movement of the electronic display.

By canceling or compensating for movement of the electronic display, a user may more clearly view or interpret information displayed by the electronic display. For example, a user may desire to read text on an electronic display while traveling on a bus. The user and the electronic display may experience movement while riding in the bus due to uneven road services, rapid acceleration/deceleration of the bus, or other forces that impact the user and/or the electronic device. The sensors may sense the movement of the electronic device, and in particular, of the electronic display. For example, when the bus hits a bump in the road, an accelerometer may determine that the electronic device is experiencing a rapid movement. A display manager may interpret a signal from the sensor (e.g., the accelerometer, etc.) and may refresh the display to cancel or reduce (electronically dampen) the user's perception of the movement of the electronic display. The display manager may accomplish the canceling or reducing (compensating, dampening, etc) by causing the electronic display to render the content at a different position on the electronic display (e.g., up two pixels, over three pixels, etc.), which may offset the movement of the electronic display. Thus, when the user views the electronic display as it moves in response to a force (e.g., hitting a bump in the road, etc.), the displayed content may appear to stay steady or not fully move in a same manner as the electronic display.

In various embodiments, the sensors may determine that the electronic display is subjected to an oscillation or vibration. The device manager may interpret signals from the sensors, and in response, refresh the display to minimize or remove perceived blur. As a result, the electronic display may be moving up and down (or side to side, etc.) while content on the electronic display appears to be stationary and not moving when viewed by a user. In various embodiments, a user may adjust a gain control to modify the compensation based on user preferences, thereby calibrating the compensation to best suit the user (e.g., reduce perceived blur or movement).

The techniques described herein may also be beneficial to use of a touch sensitive display. Therefore, besides enabling a user to more clearly view or interpret information displayed by the electronic display, the techniques described herein may also enable a user to more accurately select content, use a virtual keyboard on a user interface, or otherwise engage content on a moving electronic display when the electronic display is a touch sensitive display.

The techniques, apparatuses, and systems described herein may be implemented in a number of ways. Example implementations are provided below with reference to the following figures.

Illustrative Electronic Device

FIG. 1 is a schematic diagram of illustrative electronic display devices (or simply "devices") 100 having subsystems that render content on a display by employing vibration sensing and canceling to minimize perceived movement or blur of text and images on a display. In the illustrated implementation, the devices 100 are represented by various electronic devices, each of which includes a display. A non-exhaustive list of the devices 100 may include portable devices and built-in devices. Portable devices may include a notebook computer, a music player, a personal digital assistant (PDA), a mobile telephone (including smartphones), a tablet computer, an electronic book (eBook) reader, a netbook computer, a wearable device (e.g., a watch, etc.), a navigational device, or a monitor (with or without a television tuner), and so forth. Built-in devices may include displays in an automobile control system, exercise equipment, large machinery control systems (e.g., metal shaping machines, laundry machines, etc.) aircraft control systems, water vessels control systems, and so forth. Virtually any type of electronic display device may be used and may be configured to adjust the rendering of content on a display by employing vibration or movement sensing and canceling based at least in part on sensor data and in accordance with the techniques described herein. In the description that follows, the terms movement, oscillation, and vibration may be used interchangeably.

As illustrated, the devices 100 may include electronic device subsystems 102. In some embodiments, the subsystems 102 include computer-readable media 104 and one or more processors 106. The processor(s) 106 interact with the computer-readable media 104 to facilitate operation of the electronic device 100. The computer-readable media 104, meanwhile, may be used to store data 108, such as data files, audio and/or video media, eBooks, or the like. The computer-readable media 104 may also include software programs or other executable modules 110 that may be executed by the processor(s) 106. Examples of such programs or modules include indexing modules for indexing data, applications, control modules (e.g., power management), network connection software, an operating system, sensor algorithms, and the like.

The subsystems 102 also include a display 112 and a display driver 114, which includes an algorithm to render a visual representation of content (e.g., text, images, videos, etc.) on the display 112 based on pixel assignment information provided by a display manager 116. The display manager 116 may dynamically update the pixel assignment information based on sensor data. For example, the display manager 116 may aggregate information from sensors 118 to determine a pixel assignment based on the information, and then update the display to reduce or eliminate a perceived movement of an image presented on the display when the display itself is moving relative to a user. The display 112 may be any type of electronic display, such as a liquid crystal display (LCD), a plasma display, a touch screen or touch sensitive display, an electronic paper display, a projection display, or other types of displays.

In various embodiments, the sensors 118 may include some or all of an accelerometer 120, a gyroscope 122, a proximity sensor 124, a digital camera 126, and/or a global positioning system (GPS) sensor 128. However, other sensors that detect motion may also be used as discussed herein.

In some embodiments, the device 100 may be configured with an accelerometer to provide measurement of at least some of the six degrees of freedom (6-DOF). In various embodiments, the accelerometer 120 may be used to measure the 6-DOF by measuring movement along three axes aligned with each of an x-axis, a y-axis, and a z-axis. For discussion purposes, the x-axis may refer to movement viewed as left/right by a user, the y-axis may refer to movement viewed as up/down by the user, and the z-axis may refer to movement viewed as toward/away from by the user. In some embodiments, the accelerometer may measure movement along only the x-axis and the y-axis. The accelerometer may output a voltage for each of the axes to indicate a magnitude and direction of the movement experienced by the accelerometer. The proximity sensor 124 and/or the digital camera 126 may be used to measure movement, such as movement along the z-axis. In some embodiments, the digital camera 126 may also measure movement along the x-axis and/or the y-axis using position tracking. For example, the digital camera 126 may operate similar to an optical mouse used in desktop computing. The digital camera may record low resolution imagery at a high frame rate greater than typical video production. The digital camera may then analyze the imagery to determine movement along one or more of the axes. The GPS sensor 128 may measure movement of the electronic device on a large scale. For example, the GPS sensor 128 may be used to identify that the device 100 is used in a moving vehicle (e.g., car, boat, aircraft, etc.), which may then activate the display manager 116 to begin to compensate for vibration or other movement of the display 112.

In accordance with some embodiments, the sensors 118 may be located proximate, near, or adjacent to the display 112 to more accurately measure the movement of the display. The location of the sensors 118 may be particularly relevant when the electronic device is a built-in device that includes some components that are separate from the display 112 (e.g., processors located a few inches or feet from the display, etc.), which may be common in instrumentation in vehicles. Additional implementations of the various sensors are described by way of various examples included in the description of FIGS. 2-7.

The computer-readable media 104 may include volatile memory (such as RAM), nonvolatile memory, removable memory, and/or non-removable memory, implemented in any method or technology for storage of information, such as computer-readable instructions, data structures, program modules, or other data. Also, the processing unit 106 may include onboard memory in addition to or instead of the computer-readable media 104. Some examples of storage media that may be included in the computer-readable media 104 and/or processing unit 106 include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by the electronic device 100. Any such computer-readable media may be part of the electronic device 100.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processing unit 106, as hardware, and/or as firmware. Typically, the functionality of the program modules may be combined or distributed as desired in various embodiments. An implementation of these modules and techniques may be stored on or transmitted across some form of computer-readable media.

FIG. 2 is a schematic diagram of illustrative movement profiles 200 (i.e. series of movements) of a display and refreshed content on the display rendered in response to the movement. The schematic diagram shows movement of the electronic display 112 in a series of three movement profiles, which are used for discussion purposes. In accordance with various embodiments, the movement may be determined based on sensor data in at least one of three directions. Movement may be in each of an x-direction, y-direction, and z-direction, where the x-direction and y-direction are parallel to the display and perpendicular to one another and the z-direction is perpendicular to the display 112.

A first movement profile 200(1) shows the display 112 with respect to a line of sight 202 of a user. For discussion purposes, the line of sight is assumed to be static while the display 112 is assumed to move relative to both the user and line of sight 202. By measuring the movement using the sensors 118, displayed content 204 may be refreshed by the display manager 116 to appear to be stationary or nearly stationary with respect to the line of sight 202 of the user.

The display 112 may be subjected to a movement $M_1$ 206 (a force, a vector, etc.), which may cause movement of the display 112 along the y-axis (or another direction). The movement $M_1$ 206 may be detected and quantified by the sensors 118, such as to determine an amount of the movement, magnitude of the movement, and/or a direction of the movement. A resulting movement of the display 112 and the location of the content 204 within the display are shown in the second movement profile 200(2). In the second movement profile 200(2), the display 112 has moved in the y-direction a distance $D_1$. With respect to the line of sight 202, the content 204 has been refreshed on a lower portion of the display 112, and thus does not appear to move from the perspective of the user. However, the display manager 116 has moved the content downward in the display 112 an equal and opposite distance $d_1$ (shown as additional pixels in the top portion of the display 112). For example, the display manger 116 may move the content 204 within the display 112 by reassigning pixels using pixel assignment information determined based at least in part on the sensor data. The reassignment may be realized after a refreshing of the display 112 by the display manager 116.

The display 112 may then be subjected to another movement $M_2$ 208, which may cause movement of the display along the y-axis (or another direction), such as when the display is vibrating or oscillating. A resulting movement of the display 112 and the location of the content 204 within the display are shown in the third movement profile 200(3). In the third movement profile 200(3), the display 112 has moved in the negative y-direction a distance $D_2$. With respect to the line of sight 202, the content 204 has been refreshed on an upper portion of the display 112, and thus does not appear to move from the perspective of the user. However, the display manager 116 has moved the content upward in the display 112 an equal and opposite distance $d_2$ (shown by inclusion of additional pixels in the bottom portion of the display 112 in FIG. 2A). The display 112 may then be subjected to yet another movement $M_3$ 210, which may result in further updates to the position of the content on the display.

Figure 2A:
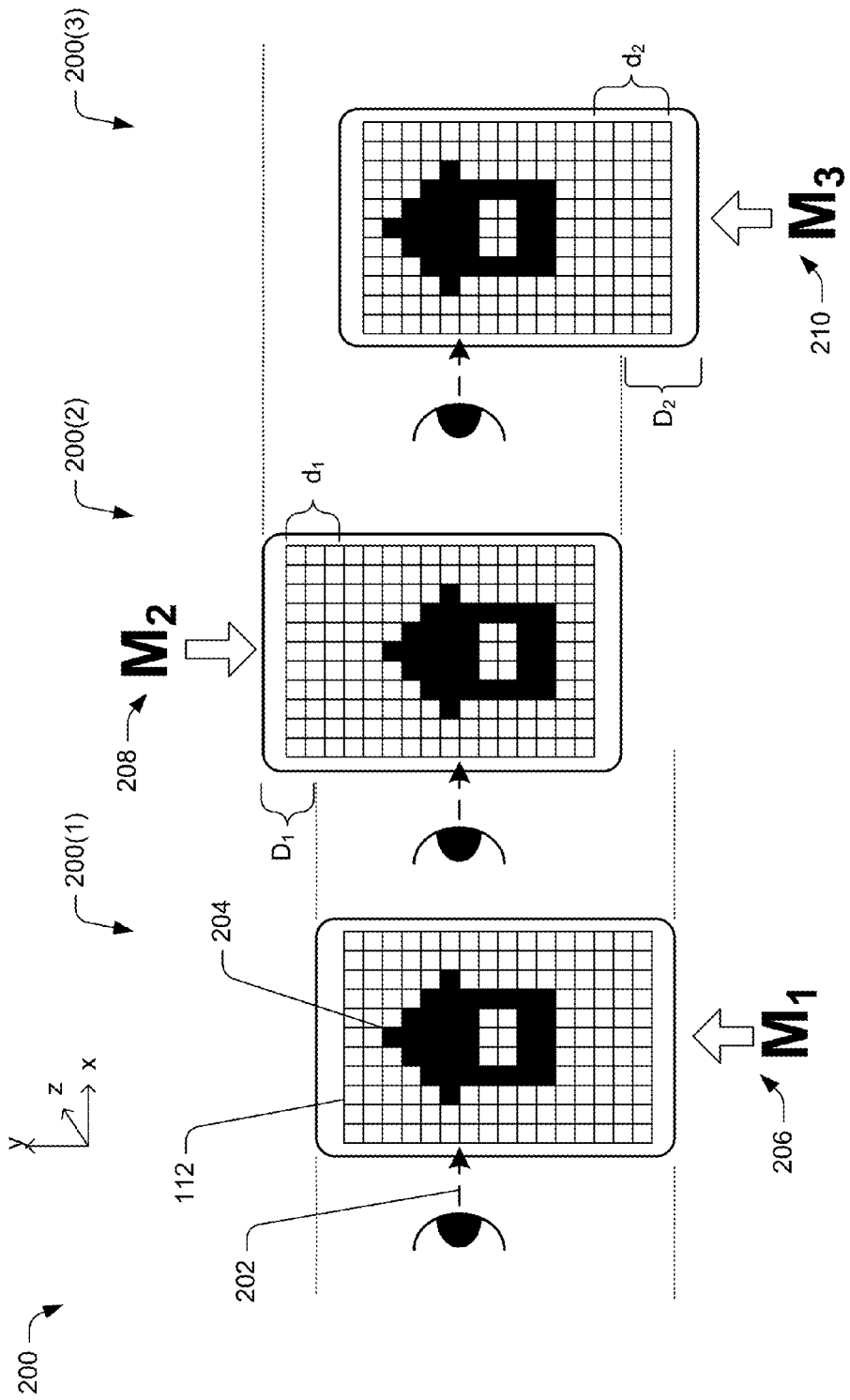
FIG. 2A is a schematic diagram of illustrative movement of a display and refreshed content on the display rendered in response to the movement.
Figure 2B:
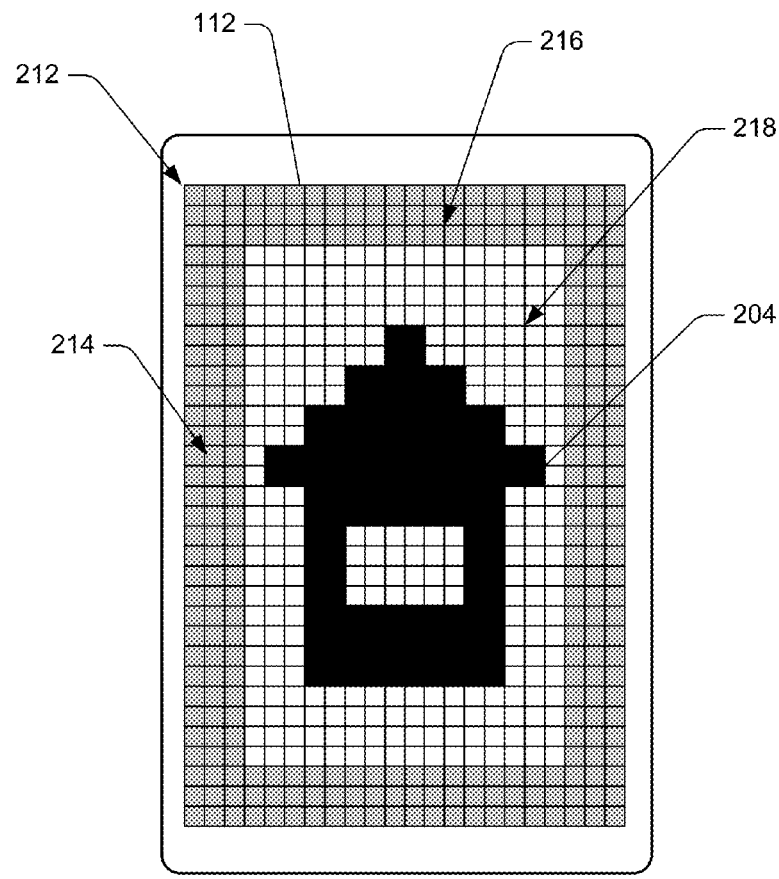
FIG. 2B is a schematic diagram showing additional pixels in the display that act as a buffer and enable movement of content within the display without losing view of the content.

FIG. 2B is a schematic diagram showing additional pixels 212 in the display 112 that act as a buffer and enable movement of the content 204 within the display 112 without losing view of the content. To accommodate this movement, in some embodiments, the display 112 may include the additional pixels 212 (buffer pixels) which may be selectively activated to enable movement of the content without the content figuratively "falling off" the display. The additional pixels 212 may be a predetermined amount of additional pixels, such as a buffer of an additional number of pixels in the x-direction 214 and an additional number of pixels in the y-direction 216. When the device is stationary, the content 204 may be displayed in a default middle location 218 that is surrounded by the additional pixels 212.

Illustrative Operation

Figure 3:
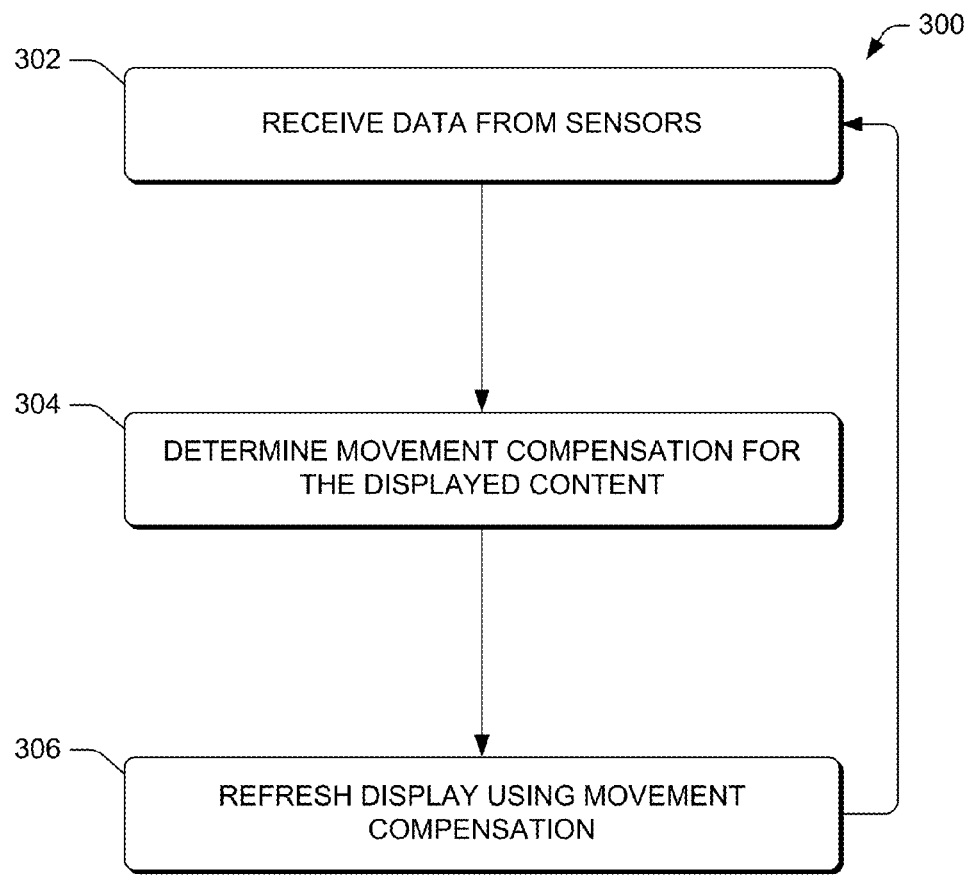
FIG. 3 is a flow diagram of an illustrative process to update a display of the electronic device based at least in part on vibration display compensation data derived from sensor data.
Figure 4:
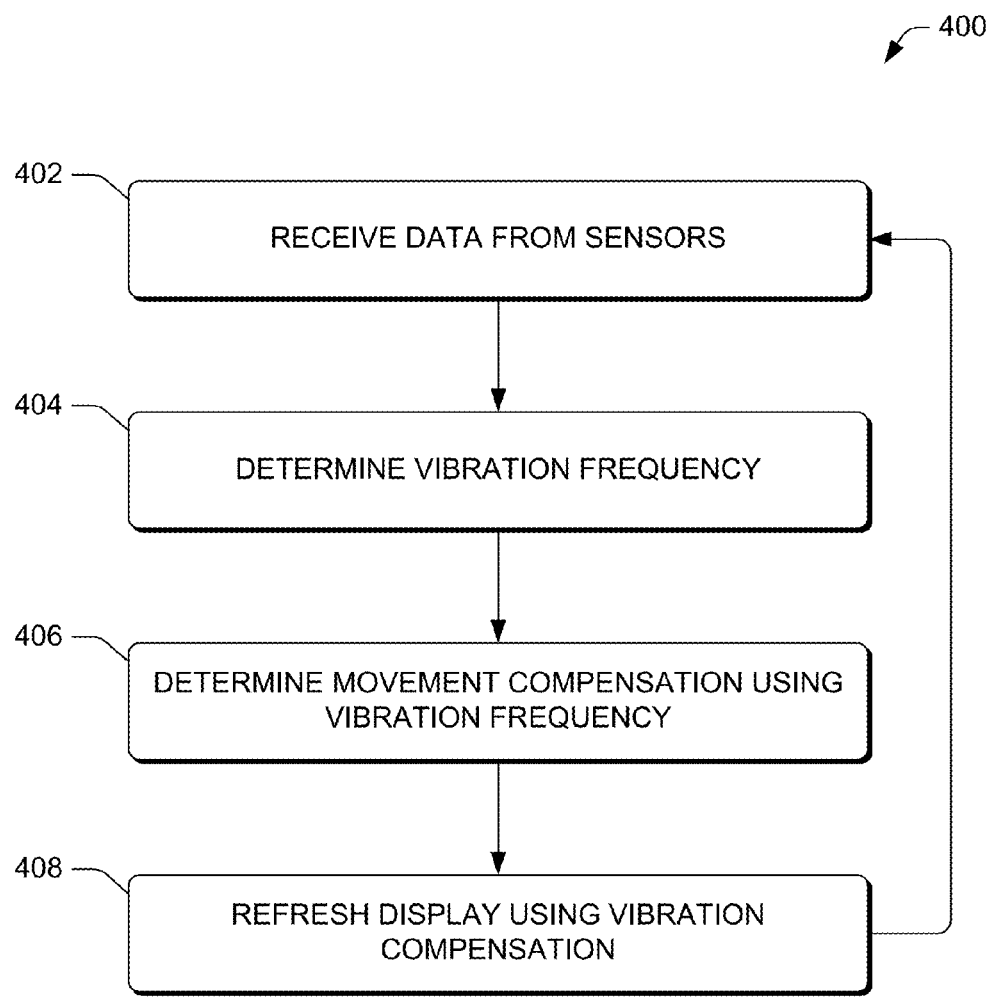
FIG. 4 is a flow diagram of an illustrative process to update a display of the electronic device based at least in part on vibration display compensation data derived from sensor data.
Figure 5:
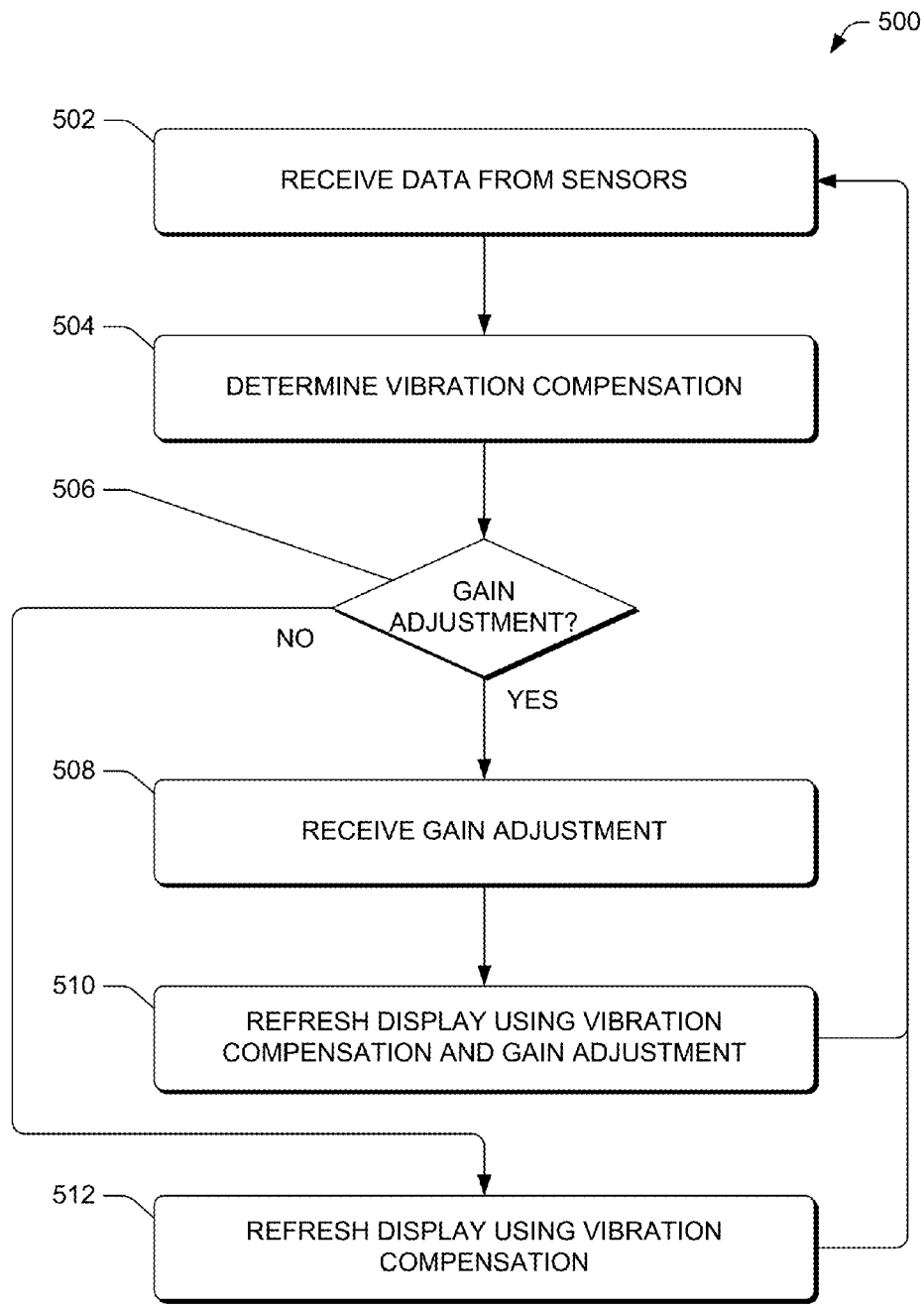
FIG. 5 is a flow diagram of an illustrative process to update a display of the electronic device based at least in part on vibration display compensation data derived from sensor data and a gain adjustment.

FIGS. 3-5 show illustrative processes to provide vibration sensing and canceling for a display of the electronic device 100. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative process 300 to update a display of the electronic device based at least in part on vibration display compensation data derived from sensor data.

At 302, the display manager 116 may receive motion data from the sensors 118. For example, the display manager 116 may receive motion data from the accelerometer that indicate a direction and magnitude of a movement, force, or vector. The display manager 116 may compile information from various types of sensors, such as the accelerometer 122, the gyroscope 122, the proximity sensor 124, and the GPS sensor 128 to increase an accuracy of the movement, force, or vector. As discussed above, the movement of the display 112 may be caused by many different external factors (e.g., a bumpy road, movement of a machine, turbulence, waves in rough waters, and so forth). Other factors may also cause movement in the display 112, such as human induced movement from a user with hands that tremble when holding the display.

At 304, the display manager 116 may determine a movement compensation for content displayed by the device 100 based at least in part on the received data from the sensors 118. For example, the display manager 116 may determine pixel assignment information to move the content 204 in an equal (or substantially equal) and opposite distance (e.g., $d_1$ shown in FIG. 2A.) as a movement sensed by the sensors 118 at the operation 302. When the sensed movement of the display 112 is a relatively large movement, the display manager 116 may be constrained in the amount of pixels that the content 204 can be moved, and therefore, may not move the content an equal amount as the actual movement of the display 112.

At 306, the display manager 116 may refresh the display 112 to present the content 204 in the new position based at least in part on the determined movement compensation determined in the operation 304. The refreshing may occur at fixed intervals, such as every x number of microseconds or Hertz.

In some embodiments, refreshing the display 112 may also update a touch sensitive area defined on the display for one or more selections of various portions of the content 204. For example, when the display 112 is a touch sensitive display, the areas on the display that are assigned to inputs (e.g., letters on a virtual keyboard, links, etc.) may also be moved and refreshed based at least in part on the determined movement compensation from the operation 304. Thus, a user may be able to make accurate selections on a device even when the display is moving, such as making accurate selections on a touch sensitive navigational display while a user is driving on a rough road that causes the display to shake or move back and forth.

FIG. 4 is a flow diagram of another illustrative process 400 to update a display of the electronic device based at least in part on vibration display compensation data derived from sensor data. At 402, the display manager 116 may receive data from the sensors 118 as described above with respect to the operation 302.

At 404, the display manager 116 may determine a vibration frequency based at least in part on the data received from the sensors 118 at the operation 402. For example, the display 112 may experience vibration while deployed in use, such as in a moving vehicle, on exercise equipment, or for other reasons. The sensors 118 may collect data, which may be analyzed by the display manager 116 to determine movement (oscillations, vibrations, etc.). In some instances, the determination at the operation 404 may occur after multiple cycles of measured movement of the display 112 by the sensors 118.

At 406, the display manager 116 may determine a movement compensation for the displayed content based at least in part on the vibration frequency determined at the operation 404. In some embodiments, the movement compensation may be deployed by the display manager 116 based on each movement (back and forth, etc.) of the display. This may occur when the determined vibration frequency is less than a refresh frequency of the display (refresh rate in Hertz, etc.). However, when the refresh rate is less frequent than the vibration frequency, then the movement may be altered by the display manager 116 in an attempt to reduce blur. For example, the display manager 116 may adjust the movement of the content to reduce perceived blur by moving the content less than an amount of anticipated movement of the display 112.

At 408, the display manager 116 may refresh the display 112 to present the content 204 in the new position based at least in part on the determined movement compensation determined in the operation 406.

FIG. 5 is a flow diagram of an illustrative process 500 to update a display of the electronic device based at least in part on vibration display compensation data derived from sensor data and a gain adjustment. The process 500 includes a gain adjustment to enable compensation when both the user and device experience vibration. However, the vibration of the user and the device 100 may not be equal, thus creating a desire to have the display manager 116 compensate, at least partially, for the movement of the display 112.

At 502, the display manager 116 may receive data from the sensors 118 as described above with reference to the operation 302.

At 504, the display manager 116 may determine a vibration (or other movement) compensation as described above with reference to the operation 304.

At 506, the device manager 116 may determine whether to adjust the compensation determined at the operation 504 using a gain adjustment. For example, the user may be able to "tune" a gain adjustment to modify the compensation determined at the operation 504. For example, a first user may perceive or experience a different vibration or frequency of vibration of the display 112 than a second user because of the movement of the first user may be different than the movement of the second user. The difference in movement may be attributed to various factors, such as the size of the users (longer/shorter arms holding device, etc.), strength, susceptibility to movement, or for other reasons. Thus, these differences may be compensated by adjusting a gain adjustment, which may then calibrate or align a movement of the device with movement of the user. The gain adjustment may be implemented as a dial control or other type of relative controller that, when used by the user, may offset the compensation determined in the operation 504. In some embodiments, the gain adjustment may be a multiplier that modifies at least one of a delay before implementing movement compensation or the gain adjustment may modify a number of pixels determined for a move of the content.

When the display manager 116 includes the gain adjustment (following the "yes" route from the operation 506), then the process 500 may advance to an operation 508 and continue processing.

At 508, the display manager 116 may receive the gain adjustment. For example, the user may select or adjust the gain adjustment using a gain controller included with the device 100, which may be a physical controller (e.g., a dial, slider, etc.) or a software control accessible via a user interface using the display 112.

At 510, the display manager 116 may refresh the display 112 to present the content 204 in the new position based at least in part on the determined movement compensation determined in the operation 504 and using any offset of a gain adjustment received from the operation 508. In some embodiments, the selection of the gain adjustment may be performed using a trial and error process where the user adjusts the gain until a blur or perceived movement of the content decreases or disappears.

When the display manager 116 does not include (or use) the gain adjustment (following the "no" route from the operation 506), then the process 500 may advance to an operation 512. At 512, the display manager 116 may refresh the display 112 to present the content 204 in the new position based at least in part on the determined movement compensation determined in the operation 504 and without using any offset of a gain adjustment.

In some embodiments, the gain adjustment may be automatically set or estimated based on data collected by the sensors of the device. For example, the sensors may record movement of the user relative to the electronic device in addition to detecting movement of the electronic device using the accelerometer. The electronic device may then determine a difference in frequencies of movement observed or captured by the digital camera or proximity sensor as compared to the movement determined by the accelerometer. This difference in movement may then be used to approximate the gain adjustment.

Illustrative Movement and Compensation

Figure 6:
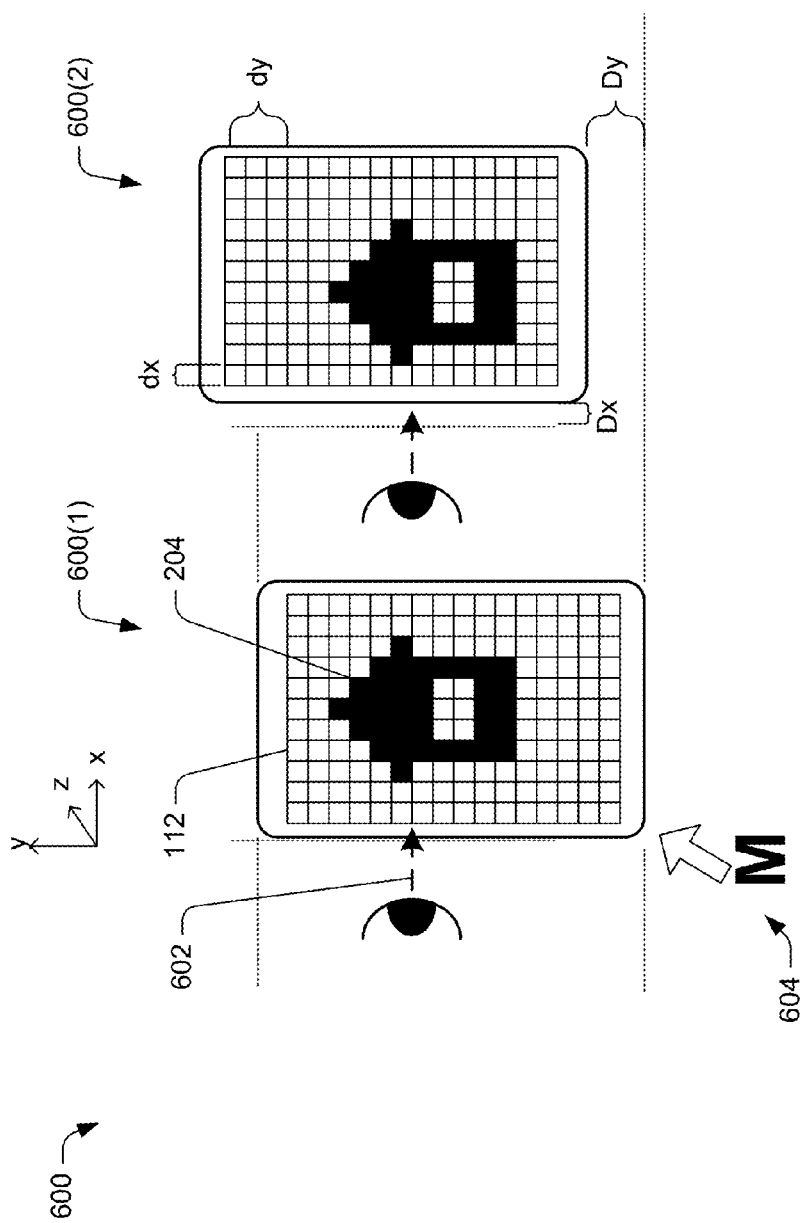
FIG. 6 is a schematic diagram of illustrative diagonal movement of a display and refreshed content on the display rendered in response to the diagonal movement.

FIG. 6 is a schematic diagram of illustrative diagonal movement profiles 600 (i.e. series of movements) of a display and refreshed content on the display rendered in response to the diagonal movement. The schematic diagram shows movement of the electronic display 112 in a series of two movement profiles, which are used for discussion purposes.

A first movement profile 600(1) shows the display 112 with respect to a line of sight 602 of a user. For discussion purposes, the line of sight is assumed to be static while the display 112 is assumed to move relative to both the user and line of sight 602. By measuring the movement using the sensors 118, displayed content 204 may be refreshed by the display manager 116 to appear to be stationary or nearly stationary with respect to the line of sight 602 of the user.

The display 112 may be subjected to a movement M 604 (a force, a vector, etc.), which may cause movement of the display along multiple axes. For example, the movement M 604 may have components of movement and magnitude in one or more of the x-direction, the y-direction, and/or the z-direction. The movement M 604 may be detected and quantified by the sensors 118, such as to determine an amount of the movement, magnitude of the movement, and/or a direction of the movement. A resulting movement of the display 112 and the location of the content 204 within the display are shown in the second movement profile 600(2). In the second movement profile 600(2), the display 112 has moved in the y-direction a distance Dy and in the x-direction a distance Dx. With respect to the line of sight 602, the content 204 has been refreshed on a lower-left portion of the display 112, and thus does not appear to move from the perspective of the user. However, the display manager 116 has moved the content downward and to the left in the display 112 an equal and opposite distance dy and dx (shown as additional pixels in the top-right portion of the display 112 shown in FIG. 6). For example, the display manger 116 may move the content 204 within the display 112 by reassigning pixels using pixel assignment information determined based at least in part on the sensor data. The reassignment may be realized after a refreshing of the display 112 by the display manager 116. In some embodiments, the movement in multi-directions may be performed by calculating movements as components of the x-direction, the y-direction, and/or the z-direction, as illustrated in FIG. 6.

Figure 7:
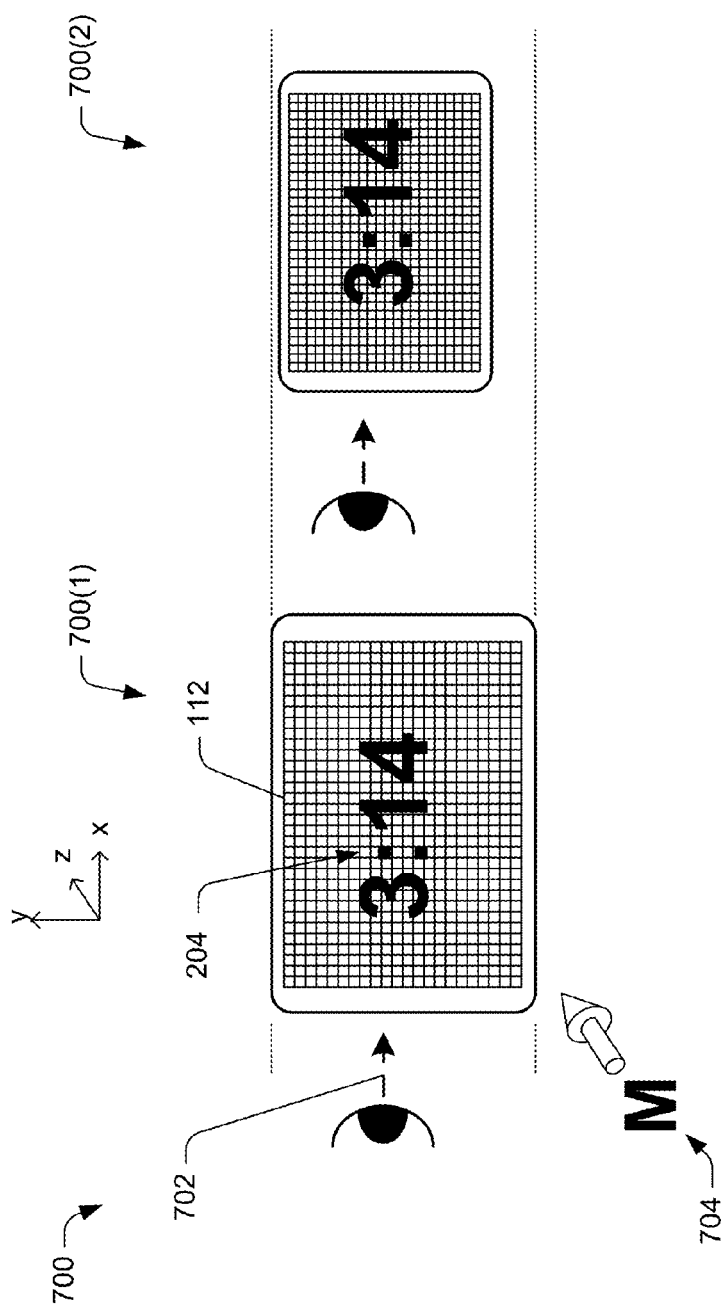
FIG. 7 is a schematic diagram of illustrative movement of a display toward or away from a user and refreshed content on the display rendered in response to the movement.

FIG. 7 is a schematic diagram of illustrative movement profiles 700 (i.e. series of movements) of a display toward or away from a user and refreshed content on the display rendered in response to the movement. The schematic diagram shows movement of the electronic display 112 in a series of two movement profiles, which are used for discussion purposes.

A first movement profile 700(1) shows the display 112 with respect to a line of sight 702 of a user. For discussion purposes, the line of sight is assumed to be static while the display 112 is assumed to move relative to both the user and line of sight 602. By measuring the movement using the sensors 118, displayed content 204 may be refreshed by the display manager 116 to appear to be stationary or nearly stationary with respect to the line of sight 702 of the user.

The display 112 may be subjected to a movement M 704 (a force, a vector, etc.), which may cause movement of the display along, at least partially, the z-axis, and thus move towards/away from the user (parallel to the line of sight 702). The movement M 704 may be detected and quantified by the sensors 118, such as to determine an amount of the movement, magnitude of the movement, and/or a direction of the movement. A resulting movement of the display 112 and the location of the content 204 within the display are shown in the second movement profile 700(2). In the second movement profile 700(2), the display 112 has moved in the z-direction a distance away from the user. With respect to the line of sight 702, the content 204 has been refreshed to an increased size on the display 112, and thus does not appear to move from the perspective of the user. However, the display manager 116 has enlarged the content 204 in the display 112. For example, the display manger 116 may resize the content 204 within the display 112 by reassigning pixels using pixel assignment information determined based at least in part on the sensor data. The reassignment may be realized after a refreshing of the display 112 by the display manager 116. In some embodiments, the resizing may be combined with movement in multi-directions may be performed by calculating movements as components of the x-direction and the y-direction. When the sensors 118 detect movement of the display 112 toward the user, the reassignment may reduce the size of the content on the display. Thus, movement of the display 112 in the z-direction may be canceled by enlarging or shrinking a size of content when the device moves away from the user or towards the user, respectively, thereby creating a perception that the content is not moving as viewed by the user having the line of sight 704.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A computer-implemented method comprising:
presenting a user interface on a plurality of pixels on a display of an electronic device, the user interface to present a gain controller to selectively modify a movement of content on the display of the electronic device, the gain controller being initially set to a first gain control value that results in assignment of content associated with a first pixel of the plurality of pixels to a second pixel of the plurality of pixels;
receiving a user input, via the gain controller, to select a second gain control value, wherein the second gain control value is a multiplier that modifies a number of pixels determined to move the content;
receiving data from a plurality of types of sensors associated with the electronic device;
determining a movement of the electronic device based at least in part on the data, the movement expressed as a first direction and a magnitude;
calculating the movement of the content to assign content to the plurality of pixels of the display of the electronic device, the movement of the content expressed as a second direction that is substantially opposite to the first direction and a distance that is based at least in part on the magnitude;
dynamically assigning the content associated with the first pixel of the plurality of pixels to a third pixel of the plurality of pixels, based at least in part on the movement of the content and the second gain control value; and
presenting the content on the display of the electronic device, based at least in part on the movement of the content and the second gain control value.

2. The computer-implemented method as recited in claim 1, wherein the receiving the data further comprises:
quantifying the movement of the electronic device in an x-direction and a y-direction, where the x-direction is parallel to an edge of the electronic device, and the y-direction is perpendicular to the x-direction, and wherein the movement of the content is based on the movement in the x-direction and the y-direction.

3. The computer-implemented method as recited in claim 1, further comprising:
determining a first measurement of the movement based at least in part on the data from an accelerometer or a gyroscope;
determining a second measurement of the movement observed or captured by at least one of a proximity sensor or a digital camera; and
further calculating the movement of the content for use in assigning the content to the plurality of pixels of the display of the electronic device based at least in part on the first measurement and the second measurement.

4. The computer-implemented method as recited in claim 1, wherein the data indicates an additional movement of the electronic device in a z-direction perpendicular to the display, and wherein the movement of the content causes the content to enlarge or shrink based on the additional movement in the z-direction.

5. The computer-implemented method of claim 1, wherein the determining the movement of the electronic device further comprises collating the data from the plurality of types of sensors to determine differences in the magnitude and the first direction.

6. An apparatus comprising:
one or more processors;
memory to store instructions executable by the one or more processors;
a display including a plurality of pixels;
a plurality of types of sensors to measure movement of the display; and
a display manager stored in the memory and executable by the one or more processors, the display manager to:
determine a movement of an image on the display based at least in part on data from the plurality of types of sensors, the data quantifying movement of the display in a first direction and a magnitude;
present, via a user interface on the display, a gain controller to selectively modify a movement of content on the display, the gain controller specifying for selection of a multiplier of at least a first gain control value and a second gain control value, wherein use of the first gain control value results in assignment of content associated with a first pixel of the plurality of pixels to a second pixel of the plurality of pixels;
determine a selection of the second gain control value, the selection caused by user interaction with the gain controller;
dynamically calculate the movement of the content of the image on the display for use in assigning content of the image to the plurality of pixels of the display, the movement of the content comprising a second direction that is substantially opposite to the first direction and a distance that is based at least in part on the magnitude; and
assign the content associated with the first pixel of the plurality of pixels to a third pixel of the plurality of pixels, based at least in part on the movement of the content and the second gain control value.

7. The apparatus as recited in claim 6, wherein the apparatus is a vehicle and the display is a built-in dashboard display.

8. The apparatus as recited in claim 6, wherein the display includes additional pixels that surround at least a portion of the display, the additional pixels to allow movement of the image into the additional pixels without loss of the image after the movement.

9. The apparatus as recited in claim 6, wherein the display manager determines movement of the image as a number of pixels by which to move the image on the display.

10. The apparatus as recited in claim 6, wherein the data quantifying the movement of the display includes data that quantifies movement in each of an x-direction and a y-direction, where the x-direction is parallel to an edge of the display, and the y-direction is perpendicular to the x-direction.

11. The apparatus as recited in claim 6, wherein the movement of the image is based at least in part on movement of the display that is parallel to a top surface of the display.

12. The apparatus as recited in claim 6, wherein the display is a touch sensitive display, and wherein the display manager is further configured to move at least one area associated with a touch screen input within the image based at least in part on the movement of the image.

13. The apparatus as recited in claim 6, wherein at least one of the first gain control value or the second gain control value, when selected, causes a delay before implementing the movement of the image.

14. The apparatus as recited in claim 6, wherein the data indicates movement of the display in a z-direction perpendicular to the display, and wherein the movement of the content causes the image to enlarge or shrink based on the movement in the z-direction.

15. The apparatus as recited in claim 14, wherein the at least one of a proximity sensor or a digital camera measures the movement of the display in the z-direction.

16. The apparatus as recited in claim 6, wherein the display manager further comprises:
determining a first measurement of the movement based at least in part on the data from an accelerometer or a gyroscope;
determining a second measurement of the movement observed or captured by at least one of a proximity sensor or a digital camera; and
further determining the movement of the display based at least in part on the first measurement and the second measurement.

17. One or more non-transitory computer-readable media storing computer-executable instructions that, when executed on one or more processors, performs acts comprising:
presenting, via a user interface on a display having a plurality of pixels, a gain controller to selectively modify a movement of content on the display, the gain controller specifying one or more gain control values, the gain controller being initially set to a first gain control value that results in assignment of content associated with a first pixel of the plurality of pixels to a second pixel of the plurality of pixels;
receiving a user input, via the gain controller of the user interface, to select a second gain control value from the one or more gain control values, wherein the second gain control value is a multiplier that modifies a number of pixels determined to move the content;

receiving data pertaining to movement of the display from a plurality of types of sensors;

determining a movement of the display based at least in part on the data, the movement expressed as a first direction and a magnitude;

calculating the movement of the content for use in assigning content to the plurality of pixels of the display, the movement of the content expressed as a second direction that is substantially opposite to the first direction and a distance that is based at least in part on the magnitude;

dynamically assigning the content associated with the first pixel of the plurality of pixels to a third pixel of the plurality of pixels, based at least in part on the movement of the content and the second gain control value; and presenting the content on the display, based at least in part on the movement of the content and the second gain control value.

18. The one or more non-transitory computer-readable media as recited in claim 17, wherein the display is a touch screen display, and wherein the acts further comprise presenting at least one area associated with a touch screen input within the content based at least in part on the movement of the content.

19. The one or more non-transitory computer-readable media as recited in claim 17, wherein the data indicates movement of the display in a z-direction perpendicular to the display, and wherein the movement of the content for the content causes the content to enlarge or shrink based on the movement in the z-direction.

* * * * *